United States Patent
Park et al.

(10) Patent No.: US 9,930,698 B2
(45) Date of Patent: Mar. 27, 2018

(54) METHOD FOR RANDOM ACCESS PROCEDURE AND TERMINAL THEREOF

(71) Applicant: LG Electronics Inc., Seoul (KR)

(72) Inventors: Sungjun Park, Seoul (KR); Youngdae Lee, Seoul (KR); Seungjune Yi, Seoul (KR); Sunghoon Jung, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 42 days.

(21) Appl. No.: 15/022,318

(22) PCT Filed: Jul. 1, 2014

(86) PCT No.: PCT/KR2014/005839
§ 371 (c)(1),
(2) Date: Mar. 16, 2016

(87) PCT Pub. No.: WO2015/064885
PCT Pub. Date: May 7, 2015

(65) Prior Publication Data
US 2016/0309517 A1    Oct. 20, 2016

Related U.S. Application Data

(60) Provisional application No. 61/898,442, filed on Oct. 31, 2013.

(51) Int. Cl.
*H04W 4/00* (2009.01)
*H04L 12/26* (2006.01)
*H04W 74/08* (2009.01)
*H04W 56/00* (2009.01)
*H04W 88/02* (2009.01)
*H04W 88/08* (2009.01)

(52) U.S. Cl.
CPC ... *H04W 74/0833* (2013.01); *H04W 56/0005* (2013.01); *H04W 88/02* (2013.01); *H04W 88/08* (2013.01)

(58) Field of Classification Search
CPC ......... H04W 74/0833; H04W 56/0005; H04W 88/08; H04W 88/02
See application file for complete search history.

(56) References Cited

U.S. PATENT DOCUMENTS

| | | | |
|---|---|---|---|
| 2013/0242951 A1 | 9/2013 | Lee et al. | |
| 2015/0043490 A1* | 2/2015 | Wu | H04W 8/26 370/329 |
| 2016/0192376 A1* | 6/2016 | Lee | H04W 48/20 370/252 |

OTHER PUBLICATIONS

ETRI, "Random Access Procedure for Small Cell Enhancements," R2-133359, 3GPP TSG-RAN2 Meeting #83bis, Ljubljana, Slovenia, Oct. 7-11, 2013, see pp. 1-3 and fig. 1.

(Continued)

*Primary Examiner* — Kiet Tang
(74) *Attorney, Agent, or Firm* — Dentons US LLP

(57) ABSTRACT

There is provided a method for random access procedure. The method may comprise: determining, by a user equipment (UE), a first subframe on which a first random access preamble is to be transmitted to a first node; determining, by the UE, a second subframe, on which a second random access preamble is to be transmitted to a second node, except for the first subframe; and transmitting, by the UE, the first random access preamble on the first subframe and the second random access preamble on the second subframe.

4 Claims, 19 Drawing Sheets

(56) References Cited

OTHER PUBLICATIONS

Interdigital Communications, "MAC Aspects of Dual Connectivity," R2-133236, 3GPP TSG-RAN2 Meeting #83bis, Ljubljana, Slovenia, Oct. 7-11, 2013, see pp. 1-5.
LG Electronics Inc., "Issues on RA procedure for dual connectivity," R2-133540, 3GPP TSG-RAN2 Meeting #83bis, Ljubljana, Slovenia, Oct. 7-11, 2013, see pp. 1-3.
Ericsson, "Random Access for dual connectivity," R2-133431, 3GPP TSG-RAN2 Meeting #83bis, Ljubljana, Slovenia, Oct. 7-11, 2013, see pp. 1-2.

* cited by examiner (A)

(B)

— · — Backhaul link within cluster
— · · — Backhaul link between small cells and macro cell — · — Backhaul link within cluster
— · · — Backhaul link between small cells and macro cell

METHOD FOR RANDOM ACCESS PROCEDURE AND TERMINAL THEREOF

This application is a 35 USC § 371 National Stage entry of International Application No. PCT/KR2014/005839 filed Jul. 1, 2014, and claims priority to U.S. Provisional Application No. 61/898,442 filed Oct. 31, 2013, all of which are hereby incorporated by reference in their entireties as if fully set forth herein.

FIELD OF THE INVENTION

The present invention relates to wireless communication, and more specifically, to a method for random access procedure and terminal

RELATED ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Examples of techniques employed in the 3GPP LTE-A include carrier aggregation.

The carrier aggregation uses a plurality of component carriers. The component carrier is defined with a center frequency and a bandwidth. One downlink component carrier or a pair of an uplink component carrier and a downlink component carrier is mapped to one cell. When a user equipment receives a service by using a plurality of downlink component carriers, it can be said that the user equipment receives the service from a plurality of serving cells. That is, the plurality of serving cells provides a user equipment with various services.

In recent, there is a discussion for adopting small cells.

SUMMARY OF THE INVENTION

In the related art as above explained, due to adoption of the small cells, it will be possible for the UE to have dual connectivities to both a conventional cell and a small cell. However, there is yet no concept and technique to realize dual connectivities.

Therefore, an object of the present invention is to provide solutions to realize dual connectivities.

To achieve these and other advantages and in accordance with the purpose of the present invention, as embodied and broadly described herein, there is provided a method for random access procedure. The method may comprise: determining, by a user equipment (UE), a first subframe on which a first random access preamble is to be transmitted to a first node; determining, by the UE, a second subframe, on which a second random access preamble is to be transmitted to a second node, except for the first subframe; and transmitting, by the UE, the first random access preamble on the first subframe and the second random access preamble on the second subframe.

To achieve these and other advantages and in accordance with the purpose of the present invention, as embodied and broadly described herein, there is also provided a terminal for performing random access procedure. The terminal may comprise: a processor configured to determine a first subframe on which a first random access preamble is to be transmitted to a first node and determine a second subframe, on which a second random access preamble is to be transmitted to a second node, except for the first subframe; and a transceiver controlled by the processor and configured to determine the first random access preamble on the first subframe and the second random access preamble on the second subframe.

The first random access preamble may be transmitted by a first MAC entity, and the second random access preamble may be transmitted by a second MAC entity.

The first MAC entity may transfer information on the first subframe to the second MAC entity The second subframe may correspond to an earliest subframe, among subframes on which the second random access preamble is capable of being transmitted, after the first subframe.

The first node may correspond to a macro eNodeB, and the second node may correspond to a small eNodeB.

According to the present specification, the above-explained problem may be solved.

DESCRIPTION OF EXEMPLARY EMBODIMENTS

Figure 1:
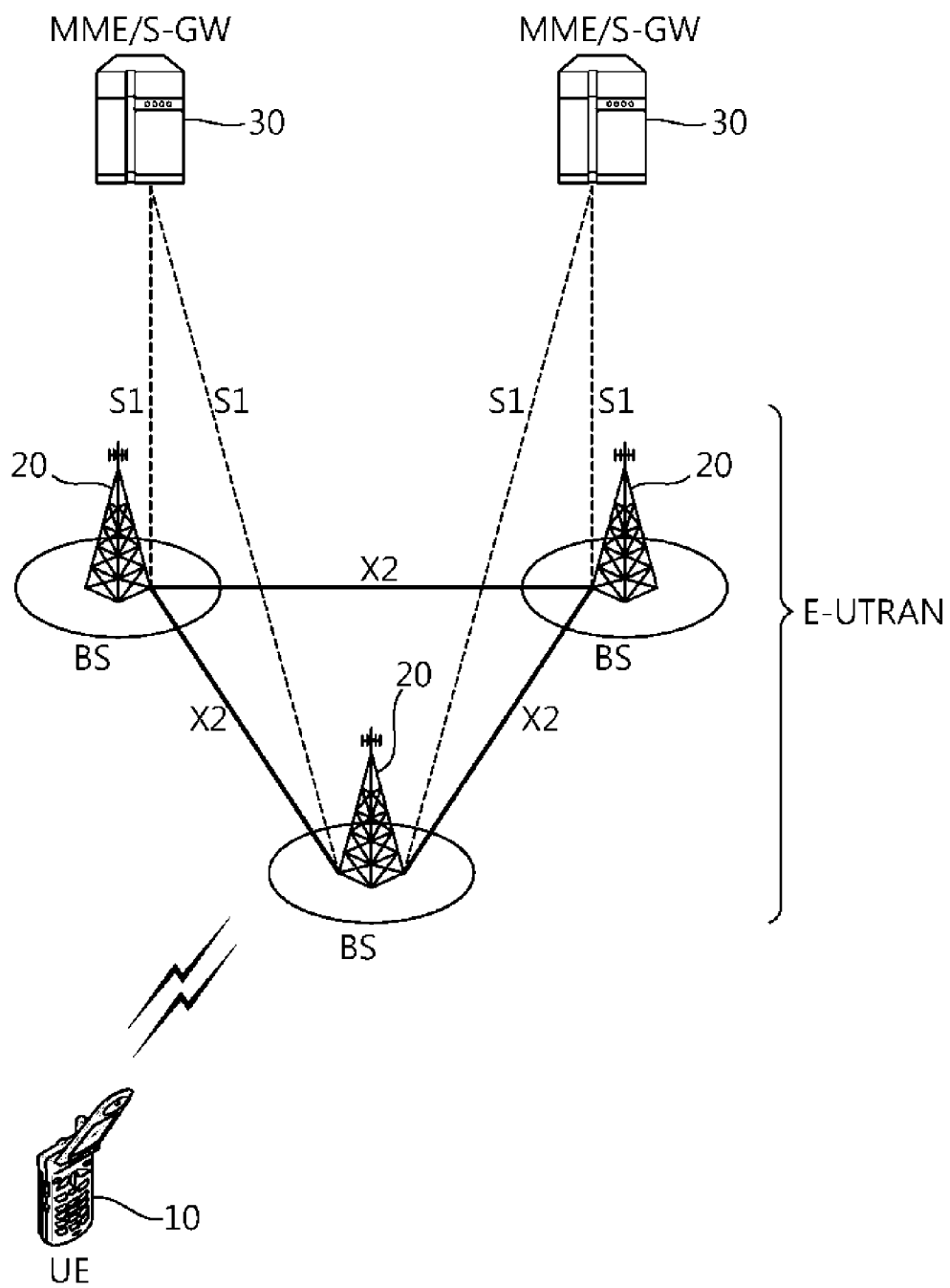
FIG. 1 shows a wireless communication system to which the present invention is applied.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

There is an exemplary UE (User Equipment) in accompanying drawings, however the UE may be referred to as terms such as a terminal, a mobile equipment (ME), a mobile station (MS), a user terminal (UT), a subscriber station (SS), a wireless device (WD), a handheld device (HD), an access terminal (AT), and etc. And, the UE may be implemented as a portable device such as a notebook, a mobile phone, a PDA, a smart phone, a multimedia device, etc, or as an unportable device such as a PC or a vehicle-mounted device.

FIG. 1 shows a wireless communication system to which the present invention is applied.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNodeB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
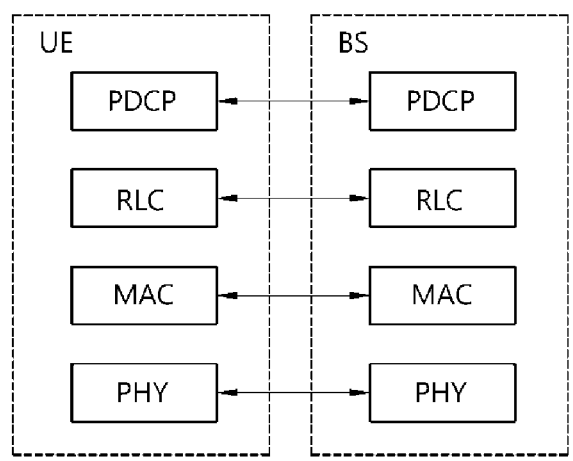
FIG. 2 is a diagram showing a radio protocol architecture for a user plane.
Figure 3:
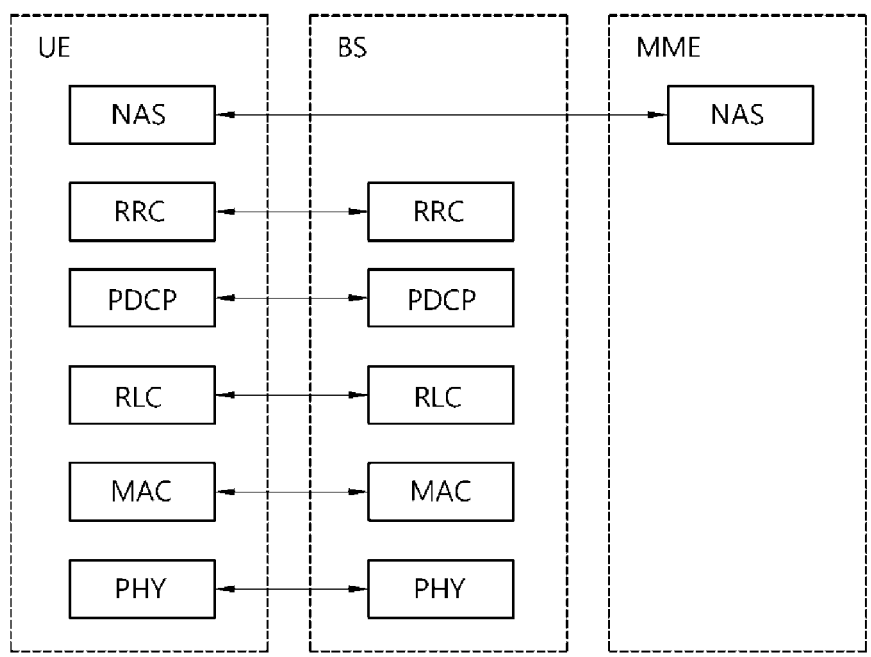
FIG. 3 is a diagram showing a radio protocol architecture for a control plane.

FIG. 2 is a diagram showing a radio protocol architecture for a user plane. FIG. 3 is a diagram showing a radio protocol architecture for a control plane.

The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred as an RRC connected mode), and otherwise the UE is in an RRC idle state (also may be referred as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

Figure 4:
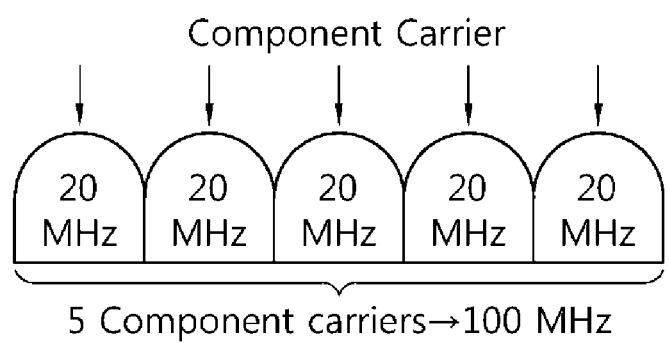
FIG. 4 shows an example of a wideband system using carrier aggregation for 3GPP LTE-A.

FIG. 4 shows an example of a wideband system using carrier aggregation for 3GPP LTE-A.

Referring to FIG. 4, each CC has a bandwidth of 20 MHz, which is a bandwidth of the 3GPP LTE. Up to 5 CCs may be aggregated, so maximum bandwidth of 100 MHz may be configured.

Figure 5:
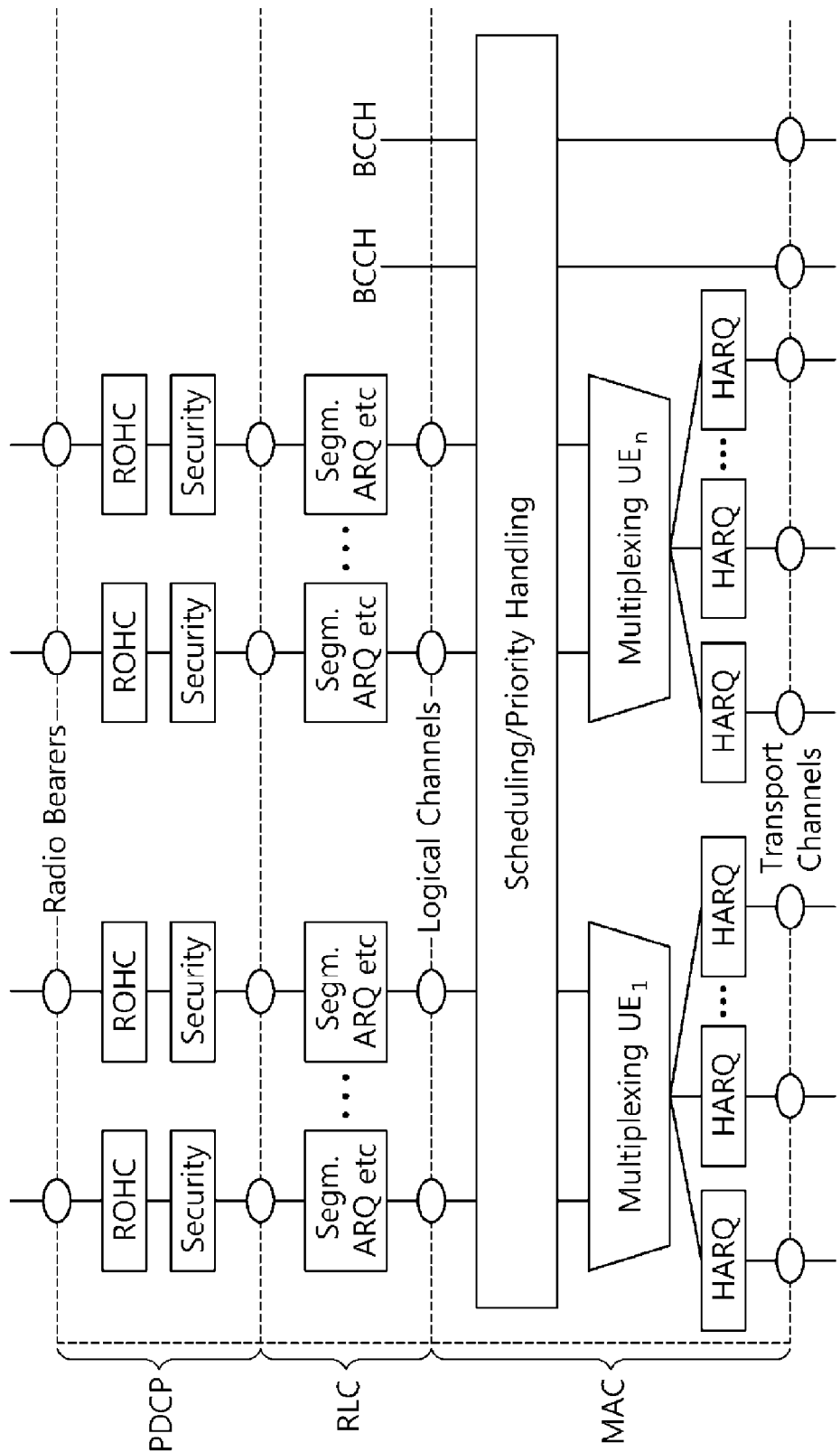
FIG. 5 shows an example of a structure of DL layer 2 when carrier aggregation is used.
Figure 6:
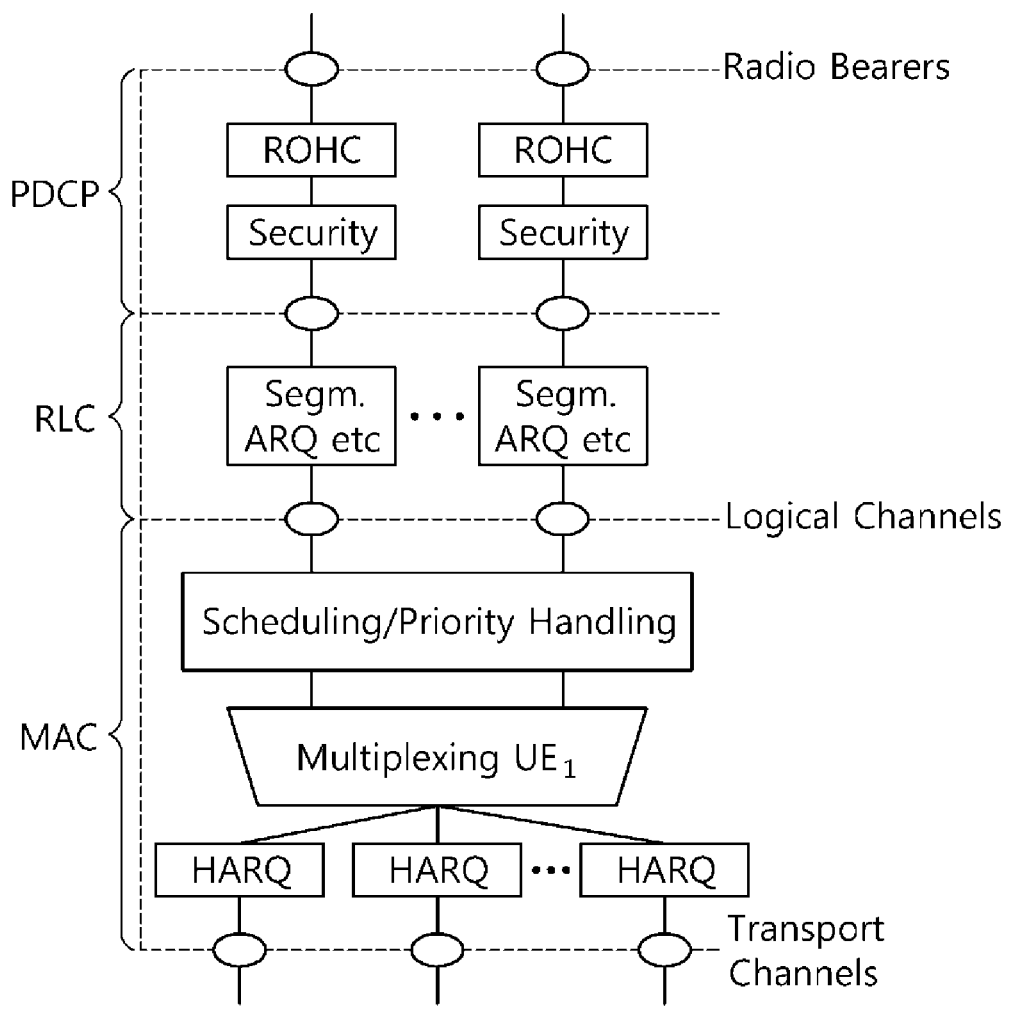
FIG. 6 shows an example of a structure of UL layer 2 when carrier aggregation is used.

FIG. 5 shows an example of a structure of DL layer 2 when carrier aggregation is used. FIG. 6 shows an example of a structure of UL layer 2 when carrier aggregation is used.

The carrier aggregation may affect a MAC layer of the L2. For example, since the carrier aggregation uses a plurality of CCs, and each hybrid automatic repeat request (HARQ) entity manages each CC, the MAC layer of the 3GPP LTE-A using the carrier aggregation may perform operations related to a plurality of HARQ entities. In addition, each HARQ entity processes a transport block independently. Therefore, when the carrier aggregation is used, a plurality of transport blocks may be transmitted or received at the same time through a plurality of CCs.

<Random Access Procedure>

Now, a random access procedure will be described.

Figure 7A:
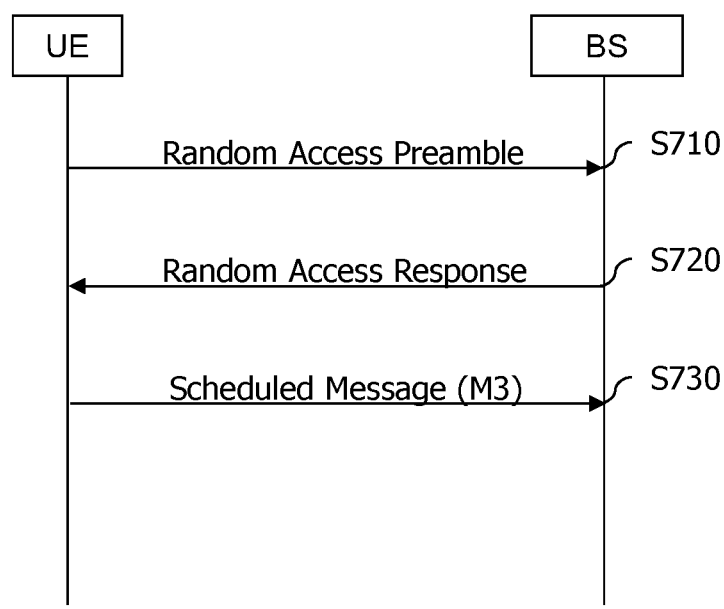
FIG. 7a is a flowchart illustrating a random access process in 3GPP LTE.

FIG. 7a is a flowchart illustrating a random access process in 3GPP LTE.

The random access process is used for a terminal to obtain UL alignment with a base station or to receive a UL radios resource allocated.

A terminal receives a root index and a physical random access channel (PRACH) configuration index from a base station. Each includes 64 candidate random access preambles defined by a Zadoff-Chu (ZC) sequence, and the root index is a logical index for a terminal to generate the 64 candidate random access preambles.

The transmission of a random access preamble is limited to a specific time and a frequency resource in each cell. The PRACH configuration index indicates a specific subframe and a preamble format available for the transmission of a random access preamble.

A terminal transmits an arbitrarily-selected random access preamble to a base station in operation S710. The terminal selects one of 64 candidate random access preambles. Then, the terminal selects a subframe corresponding to a PRACH configuration index. The terminal transmits the selected random access preamble in the selected subframe.

The base station receiving the random access preamble transmits a random access response (RAR) to the terminal in operation S720. The random access response is detected in two steps. First, the terminal detects a PDCCH masked with random access (RA)-RNTI. The terminal receives a random access response in a Medium Access Control (MAC) Protocol Data Unit (PDU) on a PDSCH indicated by the detected PDCCH.

After receiving the random access response (RAR), the terminal transmits a message, which is scheduled according to the UL grant in the random access response, to the base station in operation S730.

Hereinafter, a random access preamble may be referred to as a message M1, a random access response may be referred to as a message M2, and a scheduled message may be referred to as a message M3.

Figure 7B:
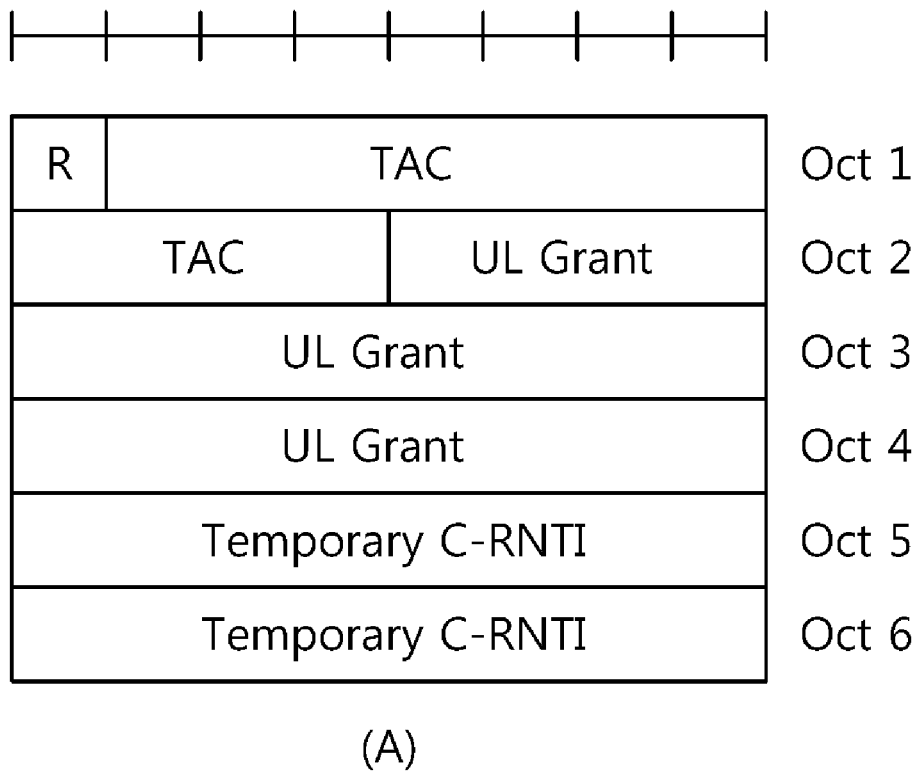
FIG. 7b is a view of a random access response.
Figure 7B:
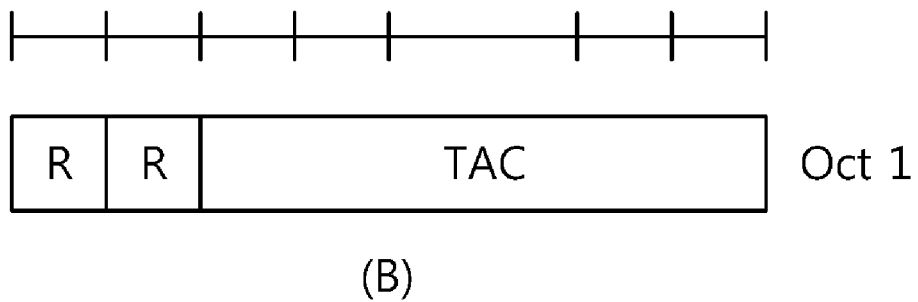

FIG. 7b is a view of a random access response.

As shown in FIG. 7b, the random access response may include TAC, UL grant, and temporary C-RNTI.

The TAC is information indicating a time alignment value transmitted from a base station to a terminal in order to maintain UL time alignment. The terminal updates the UL transmission timing by using the time alignment value. Once updating the time alignment, the terminal starts or restarts a Time Alignment Timer.

The UL grant includes UL resource allocation and a transmit power command (TPC), which are used for the transmission of a scheduling message that will be described later. The TPC is used for determining transmit power for a scheduled PUSCH.

Now, the random access procedure will be explained in more detail.

(1) Random Access Procedure Initialization

The random access procedure may be initiated by a PDCCH order or by the MAC sublayer itself. The random access procedure on an SCell may only be initiated by a PDCCH order. If a UE receives a PDCCH transmission consistent with a PDCCH order masked with its C-RNTI, and for a specific Serving Cell, the UE may initiate a random access procedure on this Serving Cell. For random access on the PCell a PDCCH order or a RRC optionally indicates the ra-PreambleIndex and the ra-PRACH-MaskIndex. And, for random access on an SCell, the PDCCH order indicates the ra-PreambleIndex with a value different from 000000 and the ra-PRACH-MaskIndex. For the pTAG preamble transmission on PRACH and reception of a PDCCH order are only supported for PCell.

Before the procedure can be initiated, the following information for related Serving Cell is assumed to be available:

- the available set of PRACH resources for the transmission of the random access preamble, prach-ConfigIndex.
- the groups of random access preambles and the set of available random access preambles in each group (PCell only):

The preambles that are contained in random access preambles group A and random access preambles group B are calculated from the parameters numberOfRA-Preambles and sizeOfRA-PreamblesGroupA:

If size of RA-Preambles Group A is equal to number Of RA-Preambles then there is no random access preambles group B. The preambles in random access preamble group A are the preambles 0 to size of RA-Preambles Group A-1 and, if it exists, the preambles in random access preamble group B are the preambles size of RA-Preambles Group A to number of RA-Preambles-1 from the set of 64 preambles.

- if random access preambles group B exists, the thresholds, message Power Offset Group B and message Size Group A, the configured UE transmitted power of the Serving Cell performing the random access Procedure, PCMAX, c, and the offset between the preamble and Msg3, deltaPreambleMsg3, that are required for selecting one of the two groups of random access preambles (PCell only).
- the RA response window size ra-ResponseWindowSize.
- the power-ramping factor powerRampingStep.
- the maximum number of preamble transmission preambleTransMax.
- the initial preamble power preambleInitialReceivedTargetPower.
- the preamble format based offset DELTA_PREAMBLE (see subclause 7.6).
- the maximum number of Msg3 HARQ transmissions maxHARQ-Msg3Tx(PCell only).
- the Contention Resolution Timer mac-ContentionResolutionTimer(PCell only).

The random access procedure may be performed as follows:

Flush the Msg3 buffer;
set the PREAMBLE_TRANSMISSION_COUNTER to 1;
set the backoff parameter value in the UE to 0 ms;
for the RN, suspend any RN subframe configuration;
proceed to the selection of the random access Resource.

(2) Random Access Resource Selection Procedure

The random access resource selection procedure may be performed as follows:

If ra-PreambleIndex (random access preamble) and ra-PRACH-MaskIndex (PRACH Mask Index) have been explicitly signalled and ra-PreambleIndex is not 000000, the random access preamble and the PRACH Mask Index are those explicitly signalled.

Else, the random access preamble may be selected by the UE as follows:
- if Msg3 has not yet been transmitted, the UE may:
- if random access preambles group B exists and if the potential message size (data available for transmission plus MAC header and, where required, MAC control elements) is greater than messageSizeGroupA and if the pathloss is less than PCMAX,c (of the Serving Cell performing the random access Procedure)—preamble InitialReceivedTargetPower—deltaPreambleMsg3—messagePowerOffsetGroupB, then select the random access preambles group B. Else, select random access preambles group A.
- if Msg3 has been transmitted and if Msg3 is being retransmitted, the UE may select the same group of random access preambles as was used for the preamble transmission attempt corresponding to the first transmission of Msg3.
- randomly select a random access preamble within the selected group. The random function may be such that each of the allowed selections can be chosen with equal probability;
- set PRACH Mask Index to 0.

Meanwhile, the UE determine the next available subframe containing PRACH permitted by the restrictions given by the prach-ConfigIndex, the PRACH Mask Index and physical layer timing requirements (a UE may take into account the possible occurrence of measurement gaps when determining the next available PRACH subframe);
- if the transmission mode is TDD and the PRACH Mask Index is equal to zero:
- if ra-PreambleIndex was explicitly signalled and it was not 000000 (i.e., not selected by MAC), randomly select, with equal probability, one PRACH from the PRACHs available in the determined subframe. Else, randomly select, with equal probability, one PRACH from the PRACHs available in the determined subframe and the next two consecutive subframes.
- if the transmission mode is not TDD and the PRACH Mask Index is not equal to zero, determine a PRACH within the determined subframe in accordance with the requirements of the PRACH Mask Index and proceed to the transmission of the random access preamble.

(3) Random Access Preamble Transmission

The random-access procedure may be performed as follows:
- set PREAMBLE_RECEIVED_TARGET_POWER to preambleInitialReceivedTargetPower+DELTA_PREAMBLE+(PREAMBLE_TRANSMISSION_COUNTER−1)*powerRampingStep;
- instruct the physical layer to transmit a preamble using the selected PRACH, corresponding RA-RNTI, preamble index and PREAMBLE_RECEIVED_TARGET_POWER.

(4) Random Access Response Reception

Once the random access preamble is transmitted and regardless of the possible occurrence of a measurement gap, the UE may monitor the PDCCH of the PCell for random access response(s) identified by the RA-RNTI defined below, in the RA Response window which starts at the subframe that contains the end of the preamble transmission plus three subframes and has length ra-ResponseWindow-Size subframes. The RA-RNTI associated with the PRACH in which the random access preamble is transmitted, is computed as:

$$RA\text{-}RNTI = 1 + t\_id + 10 * f\_id$$

Where t_id is the index of the first subframe of the specified PRACH ($0 \leq t\_id < 10$), and f_id is the index of the specified PRACH within that subframe, in ascending order of frequency domain ($0 \leq f\_id < 6$). The UE may stop monitoring for random access response(s) after successful reception of a random access response containing random access preamble identifiers that matches the transmitted random access preamble.

If a downlink assignment for this TTI has been received on the PDCCH for the RA-RNTI and the received TB is successfully decoded, the UE may regardless of the possible occurrence of a measurement gap:
- if the random access response contains a Backoff Indicator subheader, the UE may set the backoff parameter value in the UE as indicated by the BI field of the Backoff Indicator subheader. Else, the UE may set the backoff parameter value in the UE to 0 ms.
- if the random access response contains a random access preamble identifier corresponding to the transmitted random access preamble, the UE may consider this random access response reception successful and apply the following actions for the serving cell where the random access preamble was transmitted. And, the UE may process the received Timing Advance Command. And, the UE may indicate the preambleInitialReceivedTargetPower and the amount of power ramping applied to the latest preamble transmission to lower layers (i.e., (PREAMBLE_TRANSMISSION_COUNTER−1)* powerRampingStep). And, the UE may process the received UL grant value and indicate it to the lower layers. Meanwhile, if ra-PreambleIndex was explicitly signalled and it was not 000000 (i.e., not selected by MAC), the UE may consider the random access procedure successfully completed. Else, if the random access preamble was selected by UE MAC, the UE may set the Temporary C-RNTI to the value received in the random access response message no later than at the time of the first transmission corresponding to the UL grant provided in the random access response message. If this is the first successfully received random access response within this random access procedure: if the transmission is not being made for the CCCH logical channel, indicate to the Multiplexing and assembly entity to include a C-RNTI MAC control element in the subsequent uplink transmission, the UE may obtain the MAC PDU to transmit from the "Multiplexing and assembly" entity and store it in the Msg3 buffer.

If no random access response is received within the RA Response window, or if none of all received random access responses contains a random access preamble identifier corresponding to the transmitted random access preamble, the random access response reception is considered not successful and the UE may increment PREAMBLE_TRANSMISSION_COUNTER by 1. If PREAMBLE_TRANSMISSION_COUNTER=preambleTransMax+1 and if the random access preamble is transmitted on the PCell, the UE may indicate a random access problem to upper layers. Else if the random access preamble is transmitted on an SCell, the UE may consider the random access procedure unsuccessfully completed. if in this random access procedure, the random access preamble was selected by MAC, the UE may select a random backoff time according to a uniform distribution between 0 and the Backoff Parameter Value, based on the backoff parameter in the UE. And the UE may delay the subsequent random access transmission by the backoff time. The UE may proceed to the selection of a random access Resource.

(5) Contention Resolution

Contention Resolution is based on either C-RNTI on PDCCH of the PCell or UE Contention Resolution Identity on DL-SCH.

Once Msg3 is transmitted, the UE may start mac-ContentionResolutionTimer and restart mac-ContentionResolutionTimer at each HARQ retransmission. And, the UE may monitor the PDCCH until mac-ContentionResolutionTimer expires or is stopped, regardless of the possible occurrence of a measurement gap.

If notification of a reception of a PDCCH transmission is received from lower layers, if the C-RNTI MAC control element was included in Msg3, if the random access procedure was initiated by the MAC sublayer itself and the PDCCH transmission is addressed to the C-RNTI and contains an UL grant for a new transmission or if the random access procedure was initiated by a PDCCH order and the PDCCH transmission is addressed to the C-RNTI, the UE may consider this Contention Resolution successful, stop mac-ContentionResolutionTimer, discard the Temporary C-RNTI and consider this random access procedure successfully completed. Else if the CCCH SDU was included in Msg3 and the PDCCH transmission is addressed to its Temporary C-RNTI and if the MAC PDU is successfully decoded, the UE may stop mac-ContentionResolutionTimer. If the MAC PDU contains a UE Contention Resolution Identity MAC control element and if the UE Contention Resolution Identity included in the MAC control element matches the CCCH SDU transmitted in Msg3, the UE may consider this Contention Resolution successful and finish the disassembly and demultiplexing of the MAC PDU, set the C-RNTI to the value of the Temporary C-RNTI, discard the Temporary C-RNTI, and consider this random access procedure successfully completed. Else, the UE may discard the Temporary C-RNTI, consider this Contention Resolution not successful and discard the successfully decoded MAC PDU. If mac-ContentionResolutionTimer expires, the UE may discard the Temporary C-RNTI, consider the Contention Resolution not successful. If the Contention Resolution is considered not successful the UE may flush the HARQ buffer used for transmission of the MAC PDU in the Msg3 buffer, increment PREAMBLE_TRANSMISSION_COUNTER by 1. Here, if PREAMBLE_TRANSMISSION_COUNTER=preambleTransMax+1, the UE may indicate a random access problem to upper layers. Based on the backoff parameter in the UE, the UE may select a random backoff time according to a uniform distribution between 0 and the Backoff Parameter Value, delay the subsequent random access transmission by the backoff time and proceed to the selection of a random access Resource.

(6) Completion of the Random Access Procedure

At completion of the random access procedure, the UE may discard explicitly signalled ra-PreambleIndex and ra-PRACH-MaskIndex, flush the HARQ buffer used for transmission of the MAC PDU in the Msg3 buffer.

<Uplink Timing Synchronization>

Now, uplink timing synchronization will be described.

In LTE system based on an orthogonal frequency division multiplexing (OFDM) technique, there is a possibility that an interference to another user occurs in a process of performing communication between a UE and a BS. In order to minimize the interference, it is very important for the BS to manage uplink transmission timing of the UE.

More particularly, the terminal may exist in random area within a cell, and this implies that a data transmission time (i.e., traveling time of data from UE to base station) can be varied based on a location of the terminal. Namely, if the terminal is camped on edge of the cell, data transmission time of this specific terminal will be much longer than data transmission time of those terminals who camped on a center of the cell. In contrast, if the terminal is camped on the center of the cell, data transmission time of this specific terminal will be much shorter than data transmission time of those terminals who camped on the edge of the cell. The base station (eNB) must manage or handle all data or signals, which are transmitted by the terminals within the cell, in order to prevent the interferences between the terminals. Namely, the base station must adjust or manage a transmission timing of the terminals upon each terminal's condition, and such adjustment can be called as the timing alignment maintenance. One of the methods for maintaining the timing alignment is a random access procedure. Namely, during the random access procedure, the base station receives a random access preamble transmitted from the terminal, and the base station can calculate a time alignment (Sync) value using the received random access preamble, where the time alignment value is to adjust (i.e., faster or slower) a data transmission timing of the terminal. The calculated time alignment value can be notified to the terminal by a random access response, and the terminal can update the data transmission timing based on the calculated time alignment value. In other method, the base station may receive a sounding reference symbol (SRS) transmitted from the terminal periodically or randomly, the base station may calculate the time alignment (Sync) value based on the SRS, and the terminal may update the data transmission timing according to the calculated time alignment value.

As explained above, the base station (eNB) may measure a transmission timing of the terminal though a random access preamble or SRS, and may notify an adjustable timing value to the terminal. Here, the time alignment (Sync) value (i.e., the adjustable timing value) can be called as a time advance command (referred as 'TAC' hereafter). The TAC may be process in a MAC (Medium Access control) layer. Since the terminal does not camps on a fixed location, the transmission timing is frequently changed based on a terminal's moving location and/or a terminal's moving velocity. Concerning with this, if the terminal receives the time advance command (TAC) from the base station, the terminal expect that the time advance command is only valid for certain time duration. A time alignment timer (TAT) is used for indicating or representing the certain time duration. As such, the time alignment timer (TAT) is started when the terminal receives the TAC (time advance command) from the base station. The TAT value is transmitted to the terminal (UE) through a RRC (Radio Resource Control) signal such as system information (SI) or a radio bearer reconfiguration. Also, if the terminal receives a new TAC from the base station during an operation of the TAT, the TAT is restarted. Further, the terminal does not transmit any other uplink data or control signal (e.g., data on physical uplink shared channel (PUSCH), control signal on Physical uplink control channel (PUCCH) except for the random access preamble when the TAT is expired or not running. In more detail, if the TAT is expired, the terminal can perform the following operations: First, the terminal flush or empty a HARQ buffer for all serving cells. Second, the terminal informs a RRC layer to release a PUCCH/SRS resource for all serving cells. Also, the terminal releases a uplink resource and a downlink resource.

<Small Cell>

Now, a concept of small cell will be described.

In the 3rd or 4th mobile communication system, an attempt to increase a cell capacity is continuously made in order to support a high-capacity service and a bidirectional service such as multimedia contents, streaming, and the like.

That is, as various large-capacity transmission technologies are required with development of communication and spread of multimedia technology, a method for increase a radio capacity includes a method of allocating more frequency resources, but there is a limit in allocating more frequency resources to a plurality of users with limited frequency resources.

An approach to use a high-frequency band and decrease a cell radius has been made in order to increase the cell capacity. When a small cell such as a pico cell or femto cell is adopted, a band higher than a frequency used in the existing cellular system may be used, and as a result, it is possible to transfer more information.

Figure 8:
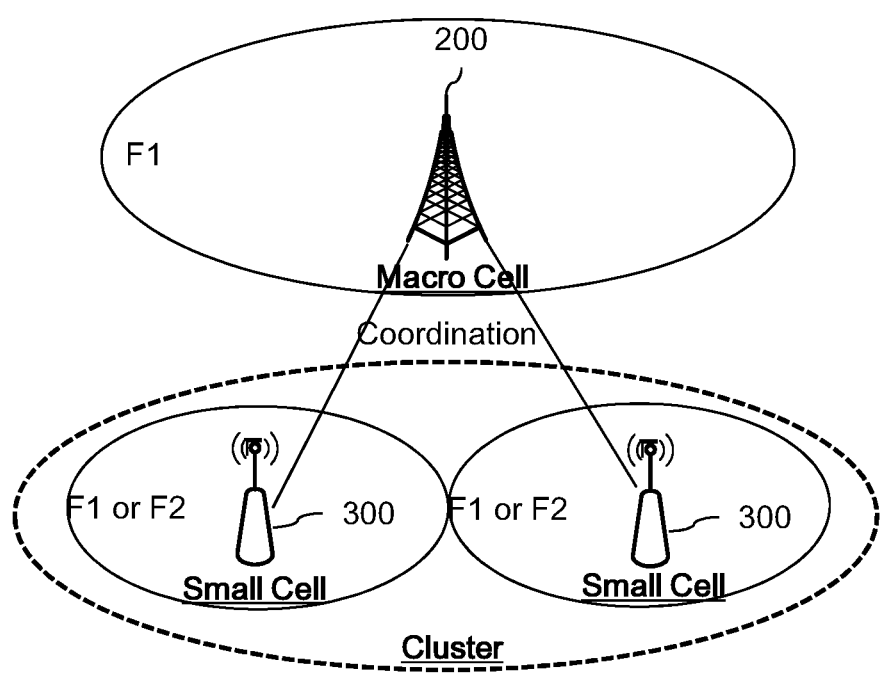
FIG. 8 shows one exemplary concept of coexistence of a macro cell and small cells.

FIG. 8 shows one exemplary concept of coexistence of a macro cell and small cells.

As shown in FIG. 8, a cell of a conventional BS or eNodeB (200) may be called as a macro cell over small cells. Each small cell is operated by each small BS or eNodeB (300). When the conventional BS or eNodeB (200) may operate in use of a frequency F1, each small cell operates in use of a frequency F1 or F2. Small cells may be grouped in a cluster. It is noted that actual deployment of small cells are varied depending on operator's policy.

Figure 9:
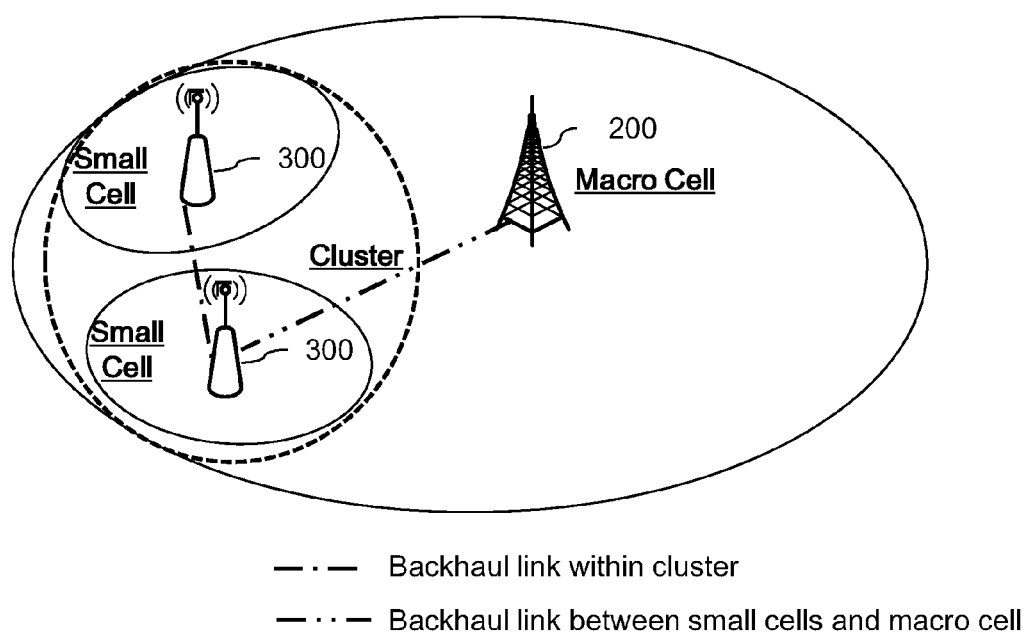
FIG. 9 shows one example of a first scenario of small cell deployment.

FIG. 9 shows one example of a first scenario of small cell deployment.

As shown in FIG. 9, the small cells may be deployed in the presence of an overlaid macro cell. That is, the small cells may be deployed in a coverage of the macro cell. In such deployment, the following may be considered.

Co-channel deployment of the macro cell and small cells

Outdoor small cell deployment

Small cell cluster is considered

The small cells are dense in cluster

Details regarding the number/density of small cells per cluster, backhaul link for coordination among small cells and time synchronization among small cells may also be considered Both ideal backhaul and non-ideal backhaul may be also considered for the following interfaces: an interface between the small cells within the same cluster and an interface between a cluster of small cells and at least one macro eNodeB.

Non-ideal backhaul is assumed for all other interfaces.

Here, the non-ideal backhaul means that there may be a delay up to 60 ms.

Figure 10A:
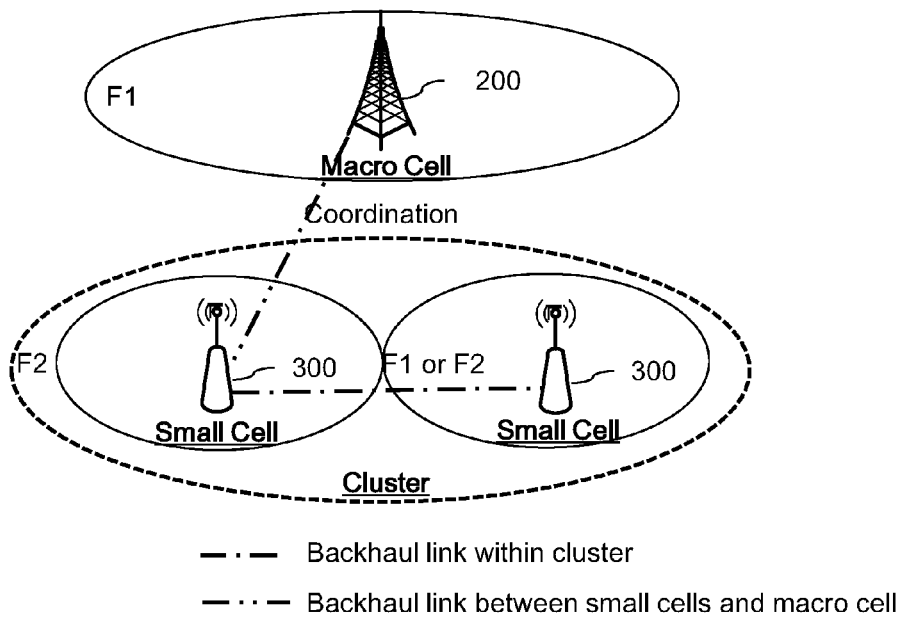
FIG. 10a shows one example of a second scenario of small cell deployment.

FIG. 10*a* shows one example of a second scenario of small cell deployment.

As shown in FIG. 10*a*, the small cells may be deployed outdoor. In such deployment, the following may be considered.

The small cells are deployed in the presence of an overlaid macro network

Separate frequency deployment of the macro cell and small cells

Outdoor small cell deployment

Small cell cluster is considered

The small cells are dense in cluster

Details regarding the number/density of small cells per cluster, backhaul link for coordination among small cells and time synchronization among small cells may also be considered.

Figure 10B:
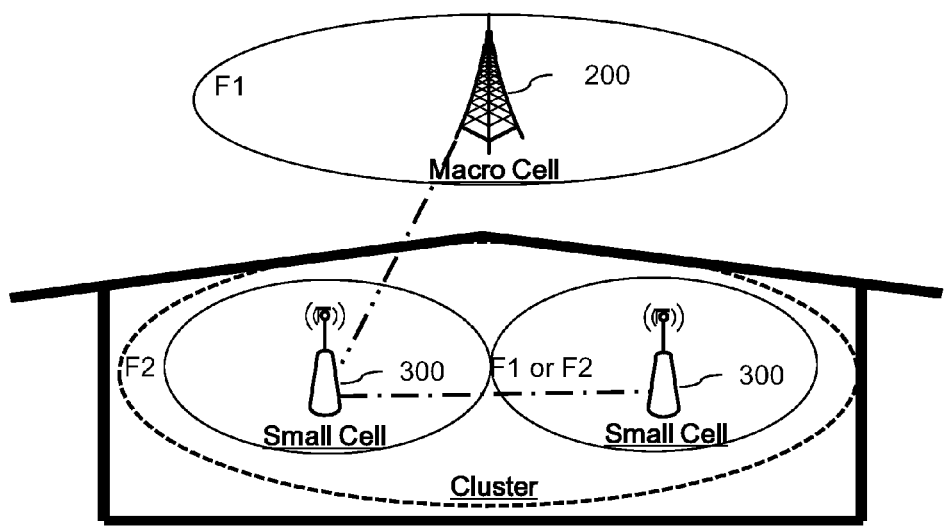
FIG. 10b shows another example of the second scenario of small cell deployment.

Both ideal backhaul and non-ideal backhaul may be also considered for the following interfaces: an interface between the small cells within the same cluster and an interface between a cluster of small cells and at least one macro eNB Non-ideal backhaul is assumed for all other interfaces FIG. 10*b* shows another example of the second scenario of small cell deployment.

As shown in FIG. 10*b*, the small cells may be deployed indoor. In such deployment, the following may be considered.

The small cells are deployed in the presence of an overlaid macro network

Separate frequency deployment of the macro cell and small cells

Indoor small cell deployment is considered

Small cell cluster is considered

The small cells are dense in cluster

Details regarding the number/density of small cells per cluster, backhaul link for coordination among small cells and time synchronization among small cells may also be considered.

A sparse scenario can be also considered such as the indoor hotspot scenario.

Both ideal backhaul and non-ideal backhaul may be also considered for the following interfaces: an interface between the small cells within the same cluster and an interface between a cluster of small cells and at least one macro eNB Non-ideal backhaul is assumed for all other interfaces.

Figure 11:
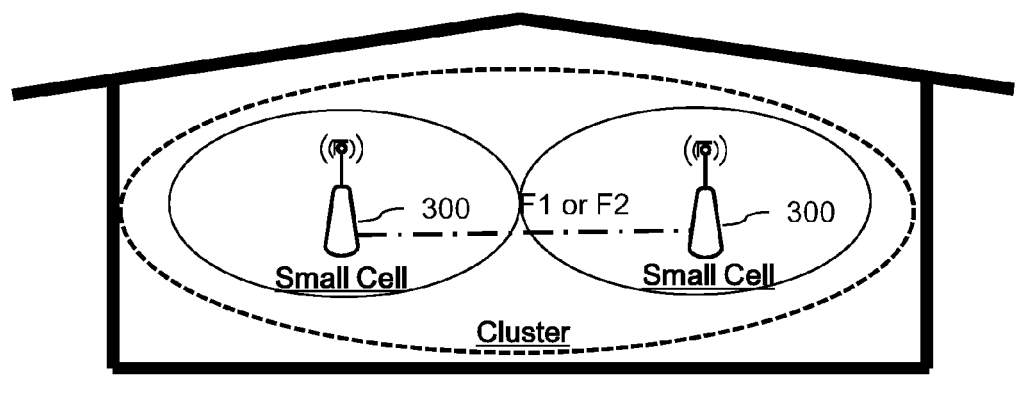
FIG. 11 shows one example of a third scenario of small cell deployment.

FIG. 11 shows one example of a third scenario of small cell deployment.

As shown in FIG. 11, the small cells may be deployed indoor. In such deployment, the following may be considered.

Macro cell coverage is not present

Indoor deployment scenario is considered

Small cell cluster is considered

The small cells are dense in cluster

Details regarding the number/density of small cells per cluster, backhaul link for coordination among small cells and time synchronization among small cells may also be considered.

A sparse scenario can be considered such as the indoor hotspot scenario.

Both ideal backhaul and non-ideal backhaul may be also considered for the following interfaces: an interface between the small cells within the same cluster.

Non-ideal backhaul is assumed for all other interfaces.

Figure 12:
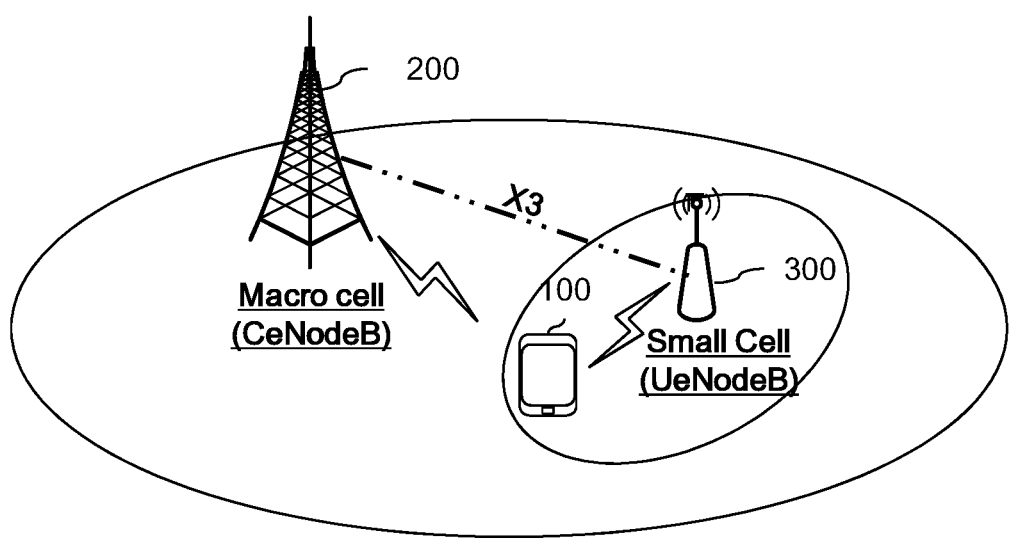
FIG. 12 shows a concept of dual connectivities

FIG. 12 shows a concept of dual connectivities

As illustrated in FIG. 12. the UE 100 has dual connectivities to both Macro cell and small cell. Here, the connectivity means the connection to eNodeB for data transfer. If the UE is served by both one macro cell and one small cell, it can be said that the UE has dual connectivities, i.e., one connectivity for the macro cell and another connectivity for the small cell. If the UE is served by small cells, it can be said that the UE has multiple connectivity.

The macro cell is served by a Macro eNodeB (hereinafter, "MeNodeB") and the small cell or group of small cells is served by a Small eNodeB (hereinafter, "SeNodeB"). Meanwhile, if a cell is responsible for managing control plane specific operations, e.g., RRC connection control and mobility, e.g., transfer of control data on signaling radio bearers (SRBs), an eNodeB of the cell may be called as User-plane eNodeB (hereinafter, "UeNodeB" or "UeNB"). On the other hand, if a cell is responsible for managing user plane specific operations, e.g., transfer of data on data radio bearers (DRBs), an eNodeB of the cell may be called as Control-plane eNodeB (hereinafter, "CeNodeB" or "CeNB").

In this FIG. 12, the MeNodeB corresponds to a CeNodeB and the SeNodeB corresponds to UeNodeB.

The small cell of UeNodeB is responsible for transmitting best effort (BE) type traffic, while the macro cell of the CeNodeB is responsible for transmitting other types of traffic such as VoIP, streaming data, or signaling data.

It is noted that there is X3 interface between CeNodeB and UeNodeB that is similar to conventional X2 interface between eNodeBs.

Figure 13:
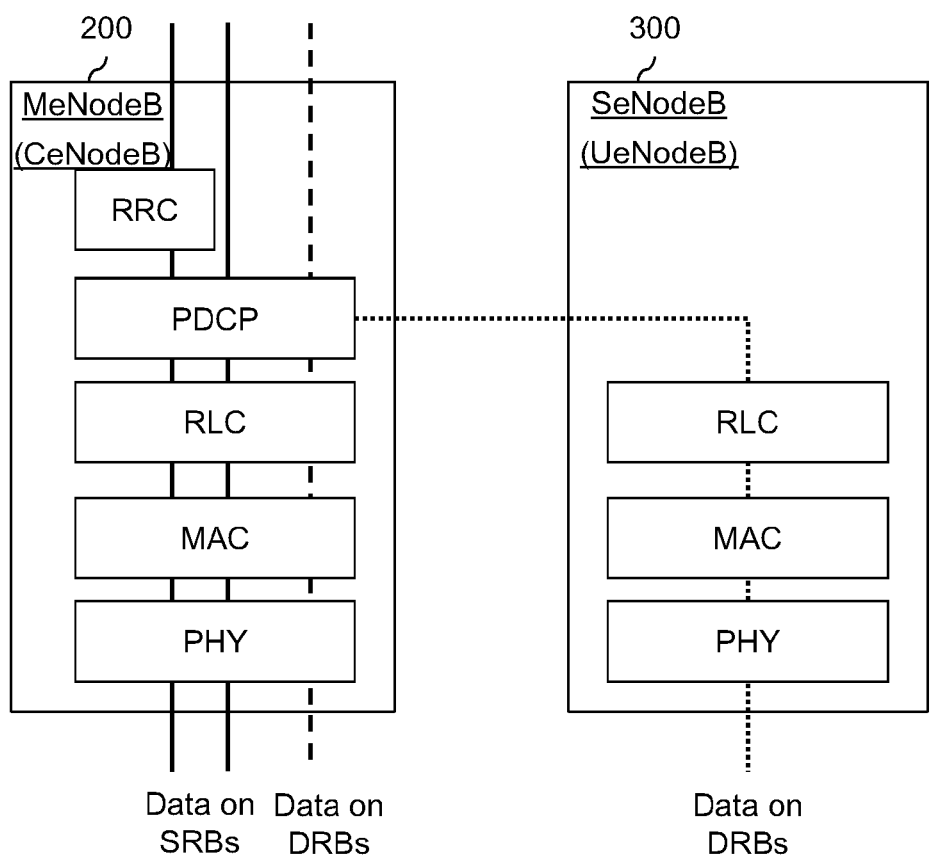
FIG. 13 shows radio protocols of eNodeBs for supporting dual connectivities.

FIG. 13 shows radio protocols of eNodeBs for supporting dual connectivities.

For dual or multiple connectivities, MAC functions of the UE 100 needs to be newly defined because from Layer 2 protocol point of view, RLC functions and configurations are bearer-specific while MAC functions and configurations are not.

To support dual or multiple connectivities, various protocol architectures are studied, and one of potential architectures is shown in FIG. 13. In this architecture, PDCP entity for UeNodeB is located in different network nodes, i.e. PDCP in CeNodeB.

As shown in FIG. 13, CeNodeB includes a PHY layer, a MAC layer, an RLC layer, a PDCH layer and an RRC layer while the UeNodeB includes a PHY layer, a MAC layer and an RLC layer. It is noted that the RRC layer and the PDCP layer exist only in the CeNodeB. In other words, there is the common RRC and PDCP layer and there is a set of RLC, MAC and PHY layers per connectivity. Accordingly, data on SRBs is signaled on CeNodeB and data on DRBs is signaled on either CeNodeB or UeNodeB according to the DRB configurations. That is, the CeNodeB can deliver data on DRBs in addition to control data on SRBs, while the UeNodeB can deliver data on only DRBs.

Here, the followings are considered:
CeNodeB and UeNodeB can be different nodes.
Transfer of data on SRBs is performed on CeNodeB.
Transfer of data on DRBs is performed on either CeNodeB or UeNodeB. Whether path of data on DRBs is on CeNodeB or UeNodeB can be configured by the eNodeB, MME, or S-GW.
There is X3 interface between CeNodeB and UeNodeB that is similar to conventional X2 interface between eNodeBs.
Because RRC connection reconfiguration is managed in the CeNodeB, the CeNodeB sends information about DRB configurations to UeNodeB via X3 interface.

Figure 14:
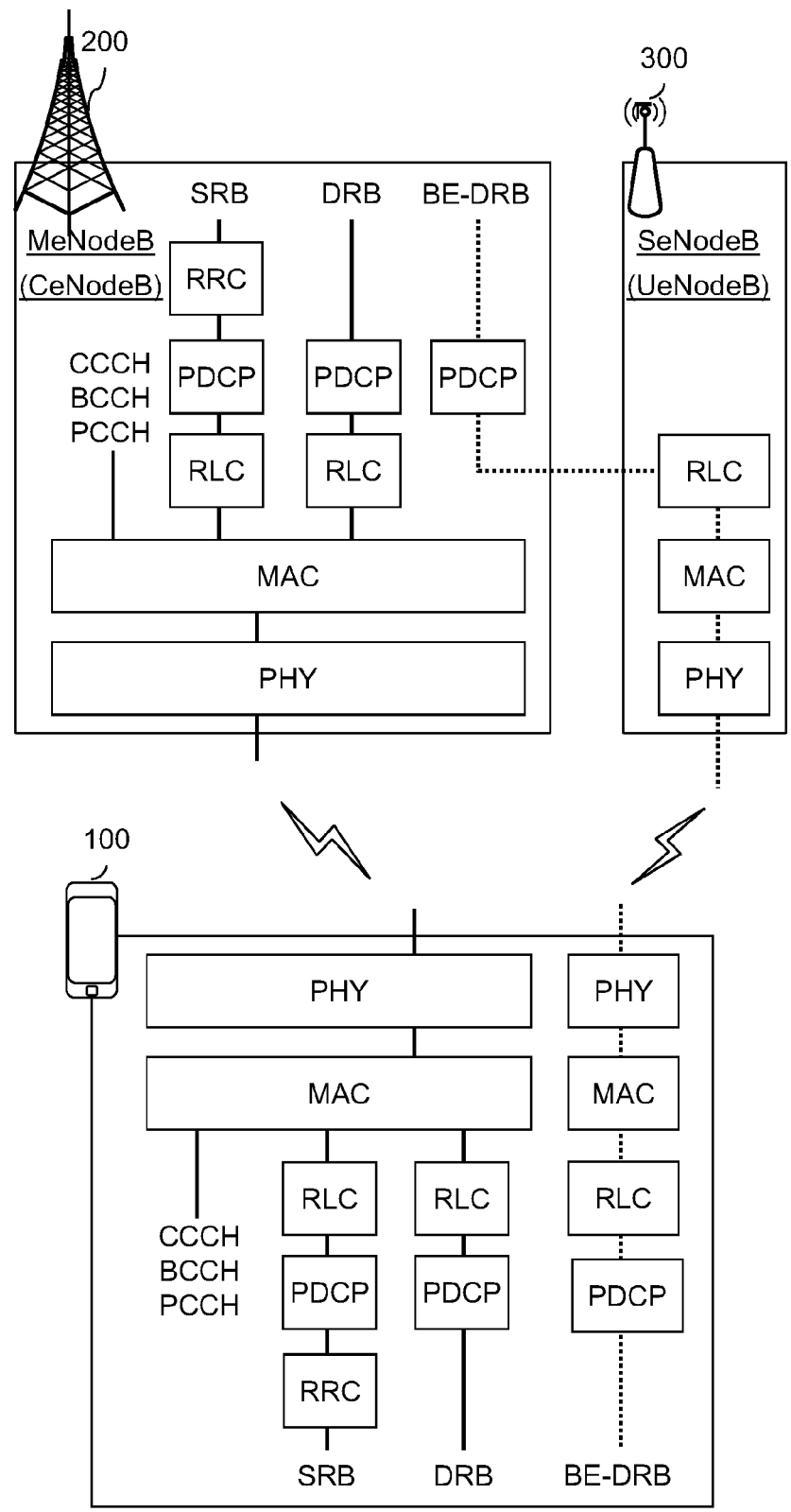
FIG. 14 shows radio protocols of UE for supporting dual connectivities.

FIG. 14 shows radio protocols of UE for supporting dual connectivities.

As shown in FIG. 14, the UeNodeB is responsible for transmitting best effort (BE) DRB. The CeNodeB is responsible for transmitting SRB and DRB. As above explained, PDCP entity for UeNodeB is located in CeNodeB.

As shown in FIG. 14, on the UE 100 side, there are plural MAC entities for macro cell of CeNodeB and small cells of UeNodeB. In other word, the UE 100 setups each MAC entity for each connectivity. Accordingly, the UE 100 includes plural MAC entities for dual or multiple connectivities. Here, although FIG. 14 illustrates two PHY entities for dual connectivities, only one PHY entity may handle dual connectivities. For the connectivity to UeNodeB, the UE 100 may include the PDCP entity, the RLC entity and the MAC entity which handle BE-DRB. For connectivity to CeNodeB, the UE 100 may include plural RLC entities, plural PDCP entities which handle SRB and DRB.

In summary, there are two MAC entities in the UE, i.e., M-MAC and S-MAC. The M-MAC is responsible for transmission between the UE and the MeNodeB, and the S-MAC is in responsible for transmission between the UE and the SeNodeB. Accordingly, the M-MAC in the UE performs the RA procedure on the MeNodeB, while the S-MAC in the UE performs the RA procedure on the SeNodeB. In the description below, M-MAC refers to the M-MAC in the UE and S-MAC refers to the S-MAC in the UE. The M-MAC in the MeNodeB and S-MAC in the SeNodeB are explicitly specified. Also, the M-RA refers to the RA procedure toward the Macro cell and the S-RA refers to word the RA procedure on the Small cell. In the description below, it is assumed that the M-MAC performs the M-RA and the S-MAC performs the S-RA.

Also, there are two PHY entities in the UE, i.e., M-PHY and S-PHY. The M-PHY is linked to the M-MAC and the S-PHY is linked to the S-PHY. In the description below, M-PHY refers to the M-PHY in the UE and S-PHY refers to the S-PHY in the UE.

However, by the current technology, the UE cannot perform a new random access procedure while another is on-going because the power required for performing multiple random access procedure can exceed the UE's maximum transmit power.

But, when the UE has dual connectivity with the MeNodeB and SeNodeB, the UE needs to perform separate random access procedure in parallel.

One Exemplary Solution According to the Present Disclosure

Therefore, the present disclosure is aimed at providing a solution to the above-explained problem.

For the solution, the present disclosure provides one example technique. According to the technique, when the UE may receive configurations on both a first MAC entity and a second MAC entity, the UE allows the first MAC entity to transfer information regarding to a first subframe, on which a random access preamble is to be transmitted, to the second MAC entity. And, the UE allows the second MAC entity to select a second subframe except for the first subframe and transmit a random access preamble on the selected second subframe.

In other words, the UE according to the technique of the present disclosure may determine a first subframe on which a first random access preamble is to be transmitted to a first node and then determine a second subframe, on which a second random access preamble is to be transmitted to a second node, except for the first subframe, thereby transmitting the first random access preamble on the first subframe and the second random access preamble on the second subframe. Such technique of the present disclosure will be explained in more detail.

Figure 15:
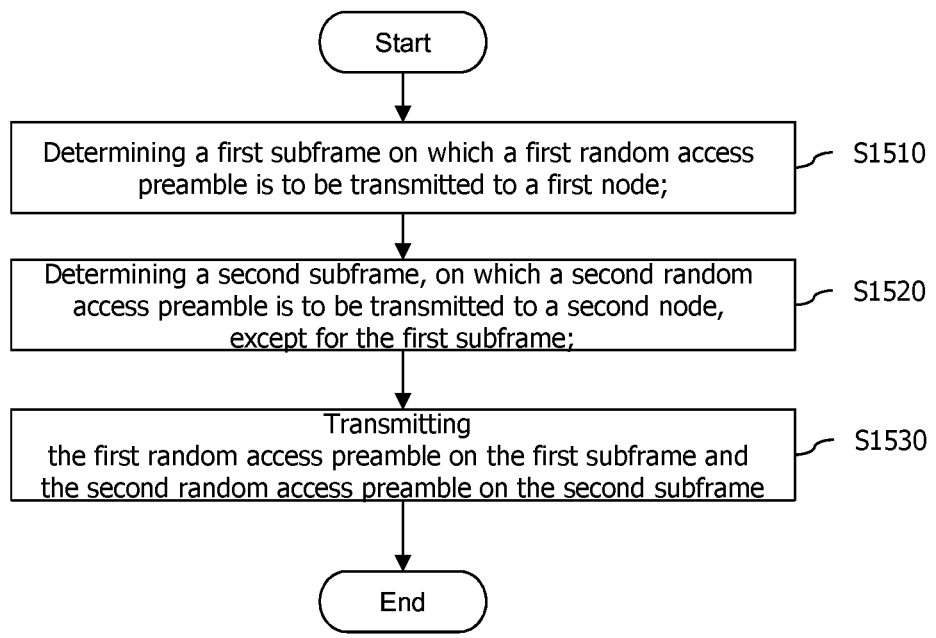
FIG. 15 shows a first exemplary method according the present disclosure.

FIG. 15 shows a first exemplary method according the present disclosure.

Referring to FIG. 15, the UE may determine a first subframe on which a first random access preamble is to be transmitted to a first node at step S1510.

Then, the UE may determine a second subframe, on which a second random access preamble is to be transmitted to a second node, except for the first subframe at step S1520.

Here, the first random access preamble may be transmitted by a first MAC entity and the second random access preamble may be transmitted by a second MAC entity. Herein, information on the first subframe may be transferred from the first MAC entity to the second MAC entity Also, the second subframe may correspond to an earliest subframe, among subframes on which the second random access preamble is capable of being transmitted, after the first subframe.

Finally, the UE transmit the first random access preamble on the first subframe and the second random access preamble on the second subframe.

Figure 16:
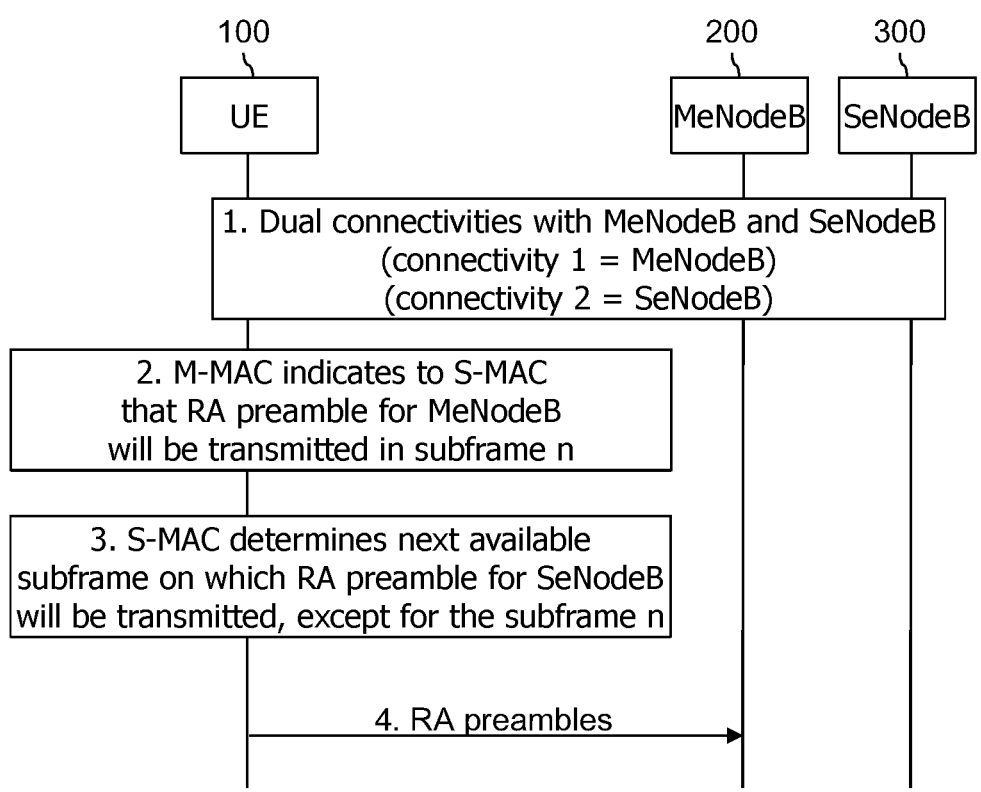
FIG. 16 shows a second exemplary method according to the present disclosure.

FIG. 16 shows a second exemplary method according to the present disclosure.

Referring to FIG. 16, the UE 100 may receive a configuration on dual connectivites to MeNodeB 200 and SeNodeB 300. The configuration may indicate that a first connectivity (connectivity 1) is for MeNodeB and a second connected (connectivity 2) is for SeNodeB. Then, the UE 100 may activate (or configure) a first MAC entity (shown as M-MAC in FIG. 16) for the first connectivity to MeNodeB and a second MAC entity (shown as S-MAC in FIG. 16) for the second connectivity to SeNodeB.

(2) The first MAC entity (or M-MAC) may determine a subframe n on which a first RA preamble for MeNodeB will be transmitted. And then, the first MAC entity (or M-MAC) indicates to the second MAC entity (or S-MAC) that the first RA preamble for MeNodeB will be transmitted in the subframe n.

(3) Then, the second MAC entity (or S-MAC) of the UE 100 determines next available subframe on which a second RA preamble for the SeNodeB will be transmitted, except for the subframe n.

(4) Finally, both the first MAC entity (or M-MAC) and the second MAC entity (or S-MAC) may transmit the first and second RA preambles.

In such a manner, the above-explained problem may be solved.

Hereinafter, other embodiments of the present disclosure will be explained.

(a) A Third Exemplary Method

For the random access resource selection, the S-MAC determines the next available subframe containing PRACH, taking into account subframes where the random access preamble transmission in the M-MAC will take place.

When the random access procedure is initiated, the random access resource selection is performed. In the random access resources selection, the preamble index and the PRACH resource are determined by MAC. For M-RA, it is performed in the M-MAC while for S-RA, it is performed in the S-MAC.

In this method, the M-MAC indicates to the S-MAC in which subframe the random access preamble will be transmitted in the M-MAC. And, when determining the next available subframe containing PRACH, the S-MAC does not consider the indicated subframes as the next available subframe containing PRACH. Then, the S-MAC transmits the random access preamble on the determined subframe to the SeNodeB.

For example, the M-MAC indicates to the S-MAC that there will be the random access preamble in the M-MAC in subframe n+7. Then, if the S-RA is initiated in the S-MAC in subframe n, the S-MAC determines the next available subframe containing PRACH. It is assumed that subframe n+7 and subframe n+9 are containing PRACH. In this example, the S-MAC does not consider subframe n+7 as the next available subframe containing PRACH because it is indicated that in this subframe, the random access preamble is transmitted in the M-MAC. Therefore, the S-MAC selects the subframe n+9 as the next available subframe containing PRACH.

This method can be restricted to be applied when the S-RA is initiated by the PDCCH order, This method is not limited to the S-RA in S-MAC. That is, it is also possible that the S-MAC indicates to the M-MAC in which subframe the random access preamble will be transmitted in the S-MAC. And, when determining the next available subframe containing PRACH, the M-MAC does not consider the indicated subframes as the next available subframe containing PRACH (b) A Fourth Exemplary Method The M-MAC sends an indication indicating start/completion of M-RA to the S-MAC.

According to this method, if there are two MAC entities in the UE (M-MAC and S-MAC), when the M-MAC starts the M-RA, the M-MAC sends an indication of start/completion of M-RA to the S-MAC. When the S-MAC receives the indication of start of M-RA from the M-MAC, the S-MAC stops/ignores the initiation of S-RA. When the S-MAC receives the indication of completion of M-RA from the M-MAC, the S-MAC starts the contention based S-RA if there is any stopped/ignored S-RA.

If the M-MAC is requested an M-RA by a PDCCH order from MeNodeB or the M-MAC itself, the M-MAC starts with the M-RA.

When the M-MAC starts with the M-RA, the M-MAC sends an indication to the S-MAC indicating that the M-MAC starts with the M-RA, which is called a 'start indication'.

In addition, when the M-MAC completes the M-RA, the M-MAC sends an indication of completion of M-RA to the S-MAC, which is called a 'completion indication'.

The M-MAC sends the 'completion indication' to the S-MAC regardless of whether the M-RA is successfully completed or unsuccessfully completed.

When the S-MAC receives the start indication from the M-MAC,

If there is an on-going S-RA, the S-MAC stops the on-going S-RA.

The S-MAC discards explicitly signaled preamble for S-RA and ra-PRACH-MaskIndex;

The S-MAC flushes the HARQ buffer used for transmission of the MAC PDU in the Msg3 buffer.

If the S-MAC is requested an S-RA by the PDCCH order from SeNodeB or by the S-MAC itself after receiving the start indication from the M-MAC, the S-MAC ignores the request of the S-RA initiation.

The S-MAC ignores the request of the S-RA initiation during the time duration between receiving the starting indication of the M-RA from the M-MAC and receiving the completion indication of the S-RA from the M-MAC When the S-MAC receives the completion indication from the M-MAC, the S-MAC starts the S-RA as a contention based random access in the following cases.

If there is any stopped S-RA in the S-MAC; or

If there is an any ignored S-RA in the S-MAC.

Figure 17:
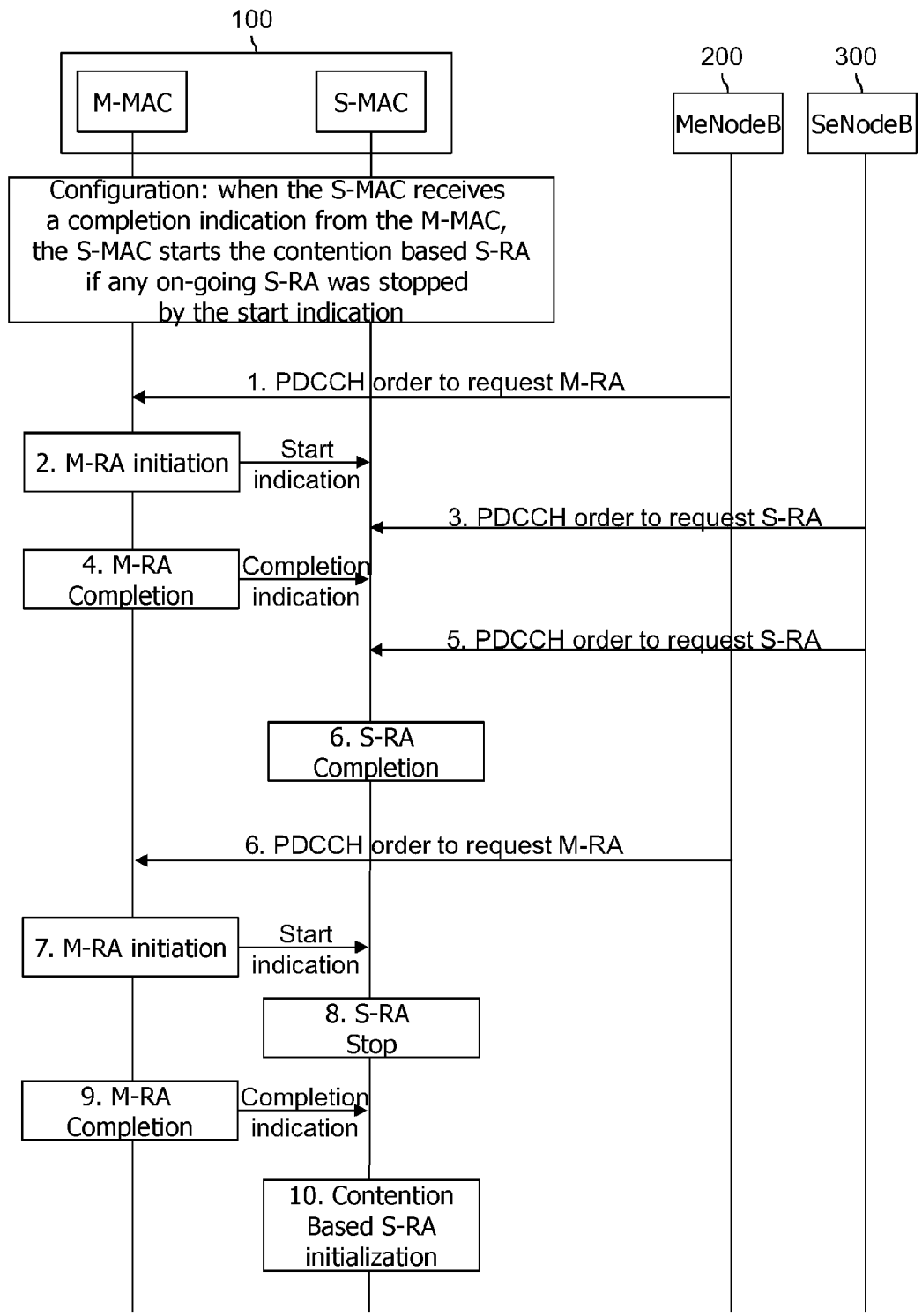
FIG. 17 shows a fourth exemplary method according to the present disclosure.

FIG. 17 shows a fourth exemplary method according to the present disclosure.

There are two MAC entities in a UE: M-MAC and S-MAC. The UE is configured by the network that when the S-MAC receives a completion indication from the M-MAC, the S-MAC starts the contention based S-RA if the S-MAC stopped any on-going S-RA upon reception of start indication from the M-MAC.

The MeNodeB sends a PDCCH order to the UE to request an M-RA.

When the M-MAC receives a PDCCH order from the MeNodeB to initialize the M-RA, the M-MAC starts with the M-RA and the M-MAC sends a start indication to the S-MAC.

The SeNodeB sends a PDCCH order to the UE to request an S-RA. Since the S-MAC receives a start indication from the M-MAC but does not receives a completion indication from the M-MAC yet, the S-MAC ignores the S-RA request from the SeNodeB.

When the M-MAC completes the M-RA, the M-MAC sends a completion indication to the S-MAC. Since there is no stopped S-RA, the S-MAC does not start the contention based S-RA.

The SeNodeB sends a PDCCH order to the UE to request an S-RA. Since the S-MAC received a completion indication from the M-MAC, the S-MAC initializes the S-RA.

The MeNodeB sends a PDCCH order to the UE to request an M-RA. Then, the M-MAC starts with the M-RA and the M-MAC sends a start indication to the S-MAC. When the S-MAC receives a start indication, the S-MAC stops the on-going S-RA.

When the M-MAC completes the M-RA, the M-MAC sends a completion indication to the S-MAC. When the S-MAC receives the completion indication from the M-MAC, the S-MAC starts the contention based S-RA because the S-MAC stopped the on-going S-RA in step 6

(c) A Fifth Exemplary Method

The S-PHY does not send the preamble for S-RA and indicates to the S-MAC that the preamble for S-RA is not sent to the SeNodeB.

When the M-RA/S-RA is requested by the PDCCH order from the MeNodeB/SeNodeB or by the M-MAC/S-MAC itself, the M-MAC/S-MAC starts with the M-RA/S-RA, respectively.

It is invented that, if there are two MAC entities in the UE (M-MAC and S-MAC), when the S-PHY is not able to transmit the preamble for S-RA to the SeNodeB as instructed by the S-MAC, the S-PHY does not transmit the preamble for S-RA to the SeNodeB. In addition, the S-PHY indicates to the S-MAC that the preamble transmission for S-RA is not performed. When the S-MAC receives the indication from the S-PHY, the S-MAC continues the S-RA or stops the S-RA. When the S-MAC continues the S-RA upon receiving the indication, the S-MAC does not increase the PREAMBLE_TRANSMISSION_COUNTER or delays the preamble transmission by the backoff.

If the M-MAC is requested an M-RA by a PDCCH order or the M-MAC itself, the M-MAC starts with the M-RA. If the S-MAC is requested an S-RA by a PDCCH order or the S-MAC itself, the S-MAC starts with the S-RA.

When the M-MAC starts with the M-RA, the M-MAC instructs the M-PHY to transmit the preamble for M-RA using the selected PRACH and the PREAMBLE_RECEIVED_TARGET_POWER. When the S-MAC starts with the S-RA, the S-MAC instructs the M-PHY to transmit the preamble for S-RA using the selected PRACH and the PREAMBLE_RECEIVED_TARGET_POWER.

When S-PHY receives the instruction from the S-MAC to transmit the preamble for S-RA, if the S-PHY is not able to transmit the preamble for S-RA to the SeNodeB using the PRACH, or the PREAMBLE_RECEIVED_TARGET_POWER as instructed from the S-MAC, the S-PHY does not transmit the preamble for S-RA to the SeNodeB.

When the S-PHY does not transmit the preamble for S-RA to the SeNodeB, the S-PHY sends an indication to the S-MAC which indicates that S-PHY is not able to transmit the preamble for S-RA to the SeNodeB.

When the S-MAC receives the indication from the S-PHY indicating that the preamble for S-RA is not transmitted in the S-PHY, the S-MAC considers that the preamble transmission is not successful and handles the S-RA as follows:

The S-MAC continues the S-RA.

The S-MAC proceeds to the selection of a random access resource without increasing the PREAMBLE_TRANSMISSION_COUNTER.

In this case, as the PREAMBLE_TRANSMISSION_COUNTER is not increased, the PREAMBLE_RECEIVED_TARGET_POWER is not increased.

The S-MAC proceeds to the selection of a random access resource by setting the backoff parameter value in the UE.

The backoff parameter value can be pre-defined between the UE and the network or configured by the network using an RRC/MAC/PHY signal.

Based on the backoff parameter value in the UE, the S-MAC selects a random backoff time according to a uniform distribution between 0 and the backoff parameter value.

The S-MAC delays the subsequent random access transmission by the backoff time, and then proceeds to the selection of a random access Resource.

The S-MAC stops the on-going S-RA.

The S-MAC discards explicitly signaled preamble for S-RA and ra-PRACH-MaskIndex, if any;

The S-MAC flushes the HARQ buffer used for transmission of the MAC PDU in the Msg3 buffer.

If the S-MAC receives the completion indication indicating that the M-MAC completes the M-RA, if the S-MAC stopped the S-RA upon receiving an indication from the S-PHY indicating that the S-PHY is not able to transmit the preamble for S-RA, the S-MAC starts the contention based S-RA.

In this case, the S-MAC starts the contention based S-RA regardless of whether the S-MAC stopped the S-RA which is initiated by the PDCCH order from the SeNodeB or by the S-MAC itself.

The ways or methods to solve the problem of the related art according to the present disclosure, as described so far, can be implemented by hardware or software, or any combination thereof.

Figure 18:
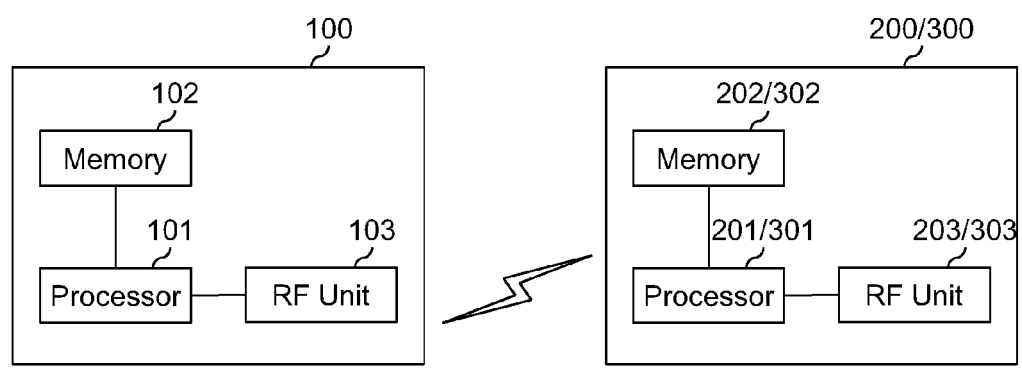
FIG. 18 is a block diagram showing a wireless communication system to implement an embodiment of the present invention.

FIG. 18 is a block diagram showing a wireless communication system to implement an embodiment of the present invention.

An UE 100 includes a processor 101, memory 102, and a radio frequency (RF) unit 103. The memory 102 is connected to the processor 101 and configured to store various information used for the operations for the processor 101. The RF unit 103 is connected to the processor 101 and configured to send and/or receive a radio signal. The processor 101 implements the proposed functions, processed, and/or methods. In the described embodiments, the operation of the UE may be implemented by the processor 101.

The eNodeB (including CeNodeB and UeNodeB) 200/300 includes a processor 201/301, memory 202/302, and an RF unit 203/303. The memory 202/302 is connected to the processor 201/301 and configured to store various information used for the operations for the processor 201/301. The RF unit 203/303 is connected to the processor 201/301 and configured to send and/or receive a radio signal. The processor 201/301 implements the proposed functions, processed, and/or methods. In the described embodiments, the operation of the eNodeB may be implemented by the processor 201.

The processor may include Application-Specific Integrated Circuits (ASICs), other chipsets, logic circuits, and/or data processors. The memory may include Read-Only Memory (ROM), random access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a random access procedure, the method comprising:
  determining, by a user equipment (UE), a first subframe on which a first random access preamble is to be transmitted to a first node;
  determining, by the UE, a second subframe on which a second random access preamble is to be transmitted to a second node, wherein the first subframe and the second subframe are not the same subframe; and
  transmitting, by the UE, the first random access preamble on the first subframe and the second random access preamble on the second subframe,
  wherein information related to the first subframe is transferred from a first medium access control (MAC) entity of the UE to a second MAC entity of the UE,
  wherein the first random access preamble is transmitted by the first MAC entity of the UE, and the second random access preamble is transmitted by the second MAC entity of the UE, and
  wherein the second subframe is a next available subframe among a plurality of subframes that are capable of transmitting the second random access preamble, after the first subframe.

2. The method of claim 1, wherein the first node corresponds to a macro eNodeB, and the second node corresponds to a small eNodeB.

3. A terminal for performing a random access procedure, the terminal comprising:
  a processor that determines a first subframe on which a first random access preamble is to be transmitted to a first node and determines a second subframe, on which a second random access preamble is to be transmitted to a second node, wherein the first subframe and the second subframe are not the same subframe; and
  a transceiver, controlled by the processor, that transmits the first random access preamble on the first subframe and the second random access preamble on the second subframe,
  wherein information related to the first subframe is transferred from a first medium access control (MAC) entity of the terminal to a second MAC entity of the terminal,
  wherein the first random access preamble is transmitted by the first MAC entity of the terminal, and the second random access preamble is transmitted by the second MAC entity of the terminal, and
  wherein the second subframe is a next available subframe among a plurality of subframes that are capable of transmitting the second random access preamble, after the first subframe.

4. The terminal of claim 3, wherein the first node corresponds to a macro eNodeB, and the second node corresponds to a small eNodeB.

* * * * *